United States Patent
Millward

[11] 3,953,671
[45] Apr. 27, 1976

[54] FEED-BACK CIRCUIT FOR CONTROLLING THE DISTANCE BETWEEN VERTICALLY DISPLACED SCANNING RASTERS PRODUCED BY A CATHODE RAY TUBE

[75] Inventor: John David Millward, Hitchin, England

[73] Assignee: The Rank Organisation Ltd., London, England

[22] Filed: Sept. 27, 1974

[21] Appl. No.: 509,961

[30] Foreign Application Priority Data
Sept. 27, 1973. United Kingdom............... 45273/73

[52] U.S. Cl............................. 178/7.2; 178/DIG. 28
[51] Int. Cl.²........................................... H04N 5/36
[58] Field of Search..................... 178/DIG. 28, 7.2; 358/54; 315/10

[56] References Cited
UNITED STATES PATENTS

| | | | |
|---|---|---|---|
| 2,753,395 | 7/1956 | Lawrence | 178/7.2 |
| 2,892,960 | 6/1959 | Nuttal | 315/10 |
| 2,929,956 | 3/1960 | Jacobs et al. | 315/10 |
| 3,358,184 | 12/1967 | Vitt | 178/7.2 |

Primary Examiner—Robert L. Richardson
Attorney, Agent, or Firm—Brisebois & Kruger

[57] ABSTRACT

Errors in the raster of a flying spot scanner are measured by placing a semi-reflecting surface in the path of the light to the object being scanned to form a secondary raster image in a position where such measurements can be made without interfering with the primary scanning operation. Preferably a feed-back circuit is used to control the cathode ray tube in dependence upon the measurement.

5 Claims, 3 Drawing Figures

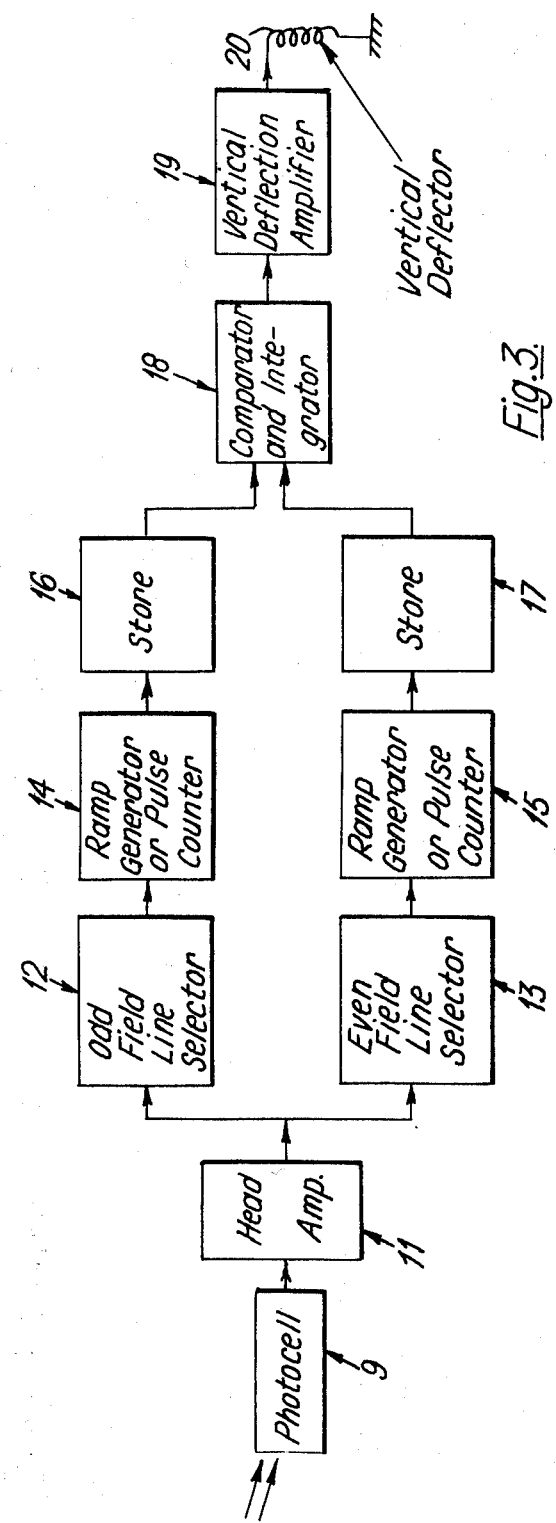

FEED-BACK CIRCUIT FOR CONTROLLING THE DISTANCE BETWEEN VERTICALLY DISPLACED SCANNING RASTERS PRODUCED BY A CATHODE RAY TUBE

This invention relates to an arrangement for accurately controlling the distance between two vertically displaced scanning rasters produced by the cathode ray tube scanning of a flying spot scanning system.

It can be shown that the long term stability of a raster produced on the face of a cathode ray tube is unlikely to be better than 0.25% of the scanning raster size. This is caused by the effect of temperature and other variations on the physical parameters of the electrical components used to produce the deflection in the cathode ray tube, on the physical stability of the cathode ray tube itself, and on the stability of the supplies feeding the cathode ray tube. For instance, the height of the raster is approximately equal to:

$$H = K \frac{Llni}{\sqrt{Ea}}$$

where
"H" is the height in centimeters,
"K" is the constant for the geometry of the deflection coil,
"L" is the length in centimeters between the cathode ray tube screen and the point where the electron beam enters the deflecting field,
"l" is the length in centimeters of the deflection coil,
"ni" is the ampere turns of the deflection coil, and
"Ea" is the anode voltage of the cathode ray tube.

With the exception of "n", all the other factors are usually temperature dependent. It is particularly difficult to stabilise the anode voltage of a cathode ray tube due to the necessity of having to measure its EHT voltage. This can only be done by using a high value resistance which cannot be manufactured to the required stability. Whereas 0.25% stability on most displays is considered adequate, where it is necessary to superimpose information the stability required is of a much higher order.

In flying spot scanners with continuous film motion, the film is scanned alternately, with two vertically displaced rasters corresponding to odd and even television fields. The maintenance of the correct vertical distance between these rasters is very important. The rasters clearly cannot be measured at the moving film and no regular stationary pattern can be interposed between the cathode ray tube and the film as this would be additive to the scanned film and would interfere with the image.

According to the present invention there is provided a scanning system comprising a cathode ray tube for producing a scanning raster, an optical system for focussing an image of the raster in the plane of an object to be scanned, means for diverting a proportion of the light travelling between the cathode ray tube and the object plane into a secondary light path to form a secondary image of the raster, and means for measuring a parameter of the secondary image of the raster.

The measured value is, of course, related to the value of the same parameter of the original raster, and thus using the invention an indication of the value of a parameter of the original scanning raster can be derived without interfering with the primary scanning operation of the system.

Preferably, the system includes a feedback circuit which controls the cathode ray tube in dependence upon the measured value to maintain the parameter of the original scanning raster within desired limits.

An embodiment of the invention will now be described, by way of example, with reference to the accompanying drawings, in which:

FIG. 3 shows a feedback circuit which is used to control the cathode ray tube of the scanning system in dependence upon measurements made with the aid of the graticule shown in FIG. 2.

Figure 1:
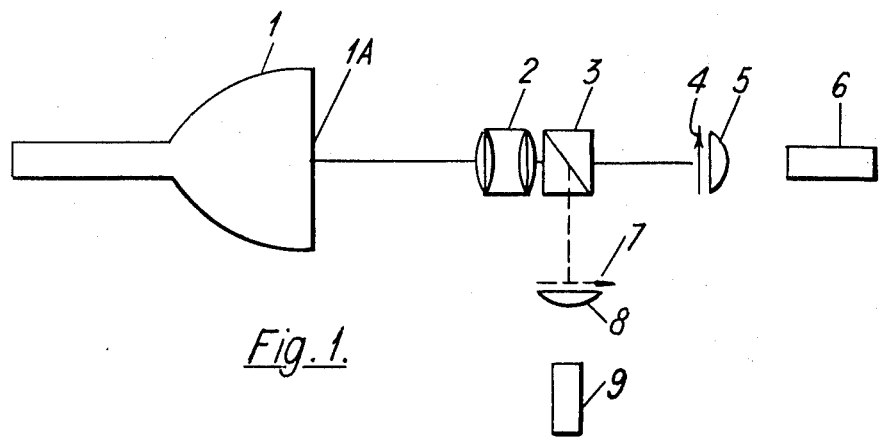
FIG. 1 is a schematic illustration of a flying spot scanning system according to the invention.

Referring to FIG. 1, cathode ray tube 1 produces alternately a pair of vertically displaced rasters on its face 1A and the rasters are focussed in the plane of the moving film 4 to be scanned by an objective lens 2. The film 4 is being scanned by transmission and thus the light is collected by a condenser 5 and focussed on a photocell 6 to be converted to an electrical video signal. Such flying spot continuous motion film scanning systems are well known and further constructional details can be readily ascertained by those skilled in the art.

The 625 television field rate is 50 HZ, and since 25 frames per second of the film are shown, each film frame is scanned twice. In practice, to obtain a minimum vertical scan height, the vertical scan is in the opposite direction to the film motion and thus two half amplitude scans will be required displaced by the half amplitude. For accurate registration the vertical distance between the two scans should be accurate to better than 0.02% of the height. Interposed between the objective lens 2 and the film 4 is a transparent block 3 of material such as glass in which is contained a semi-reflecting surface at an angle to the light path between the tube 1 and the object 4. The only effect this block has on the light path to the object is to reduce the amount of light, there being no interfering images. The block could be replaced by a very thin semi-reflecting film.

The semi-reflecting surface, which can have a reflection coefficient of from 1% to 50%, the actual value not being important as fas as the principles of the invention is concerned, diverts a proportion of the light into a secondary light path (shown as a broken line) and forms a secondary image of the vertically spaced rasters at 7. At this point, a reference geometric pattern is fixed in the focal plane of the secondary raster images and the light collected by condenser 8 is directed onto a photocell 9. The electrical signal produced by the photocell 9 is related to the geometric pattern, and the latter can be chosen so that the electrical signal provides a measure of the vertical positions of the secondary rasters at 7. Clearly, a measure of the vertical positions of the raster images at 7 will define the value of the corresponding positions of the raster images at 4. This assumes that the mechanical stability of the geometric pattern at 7, and its position relative to 3 and 4, is stable. However, these factors can be controlled more accurately than those electrical and mechanical factors mentioned earlier, since more stable materials and components can be used to control the second set of factors than is possible with the first set of factors and also there are fewer such factors involved.

Figure 2:
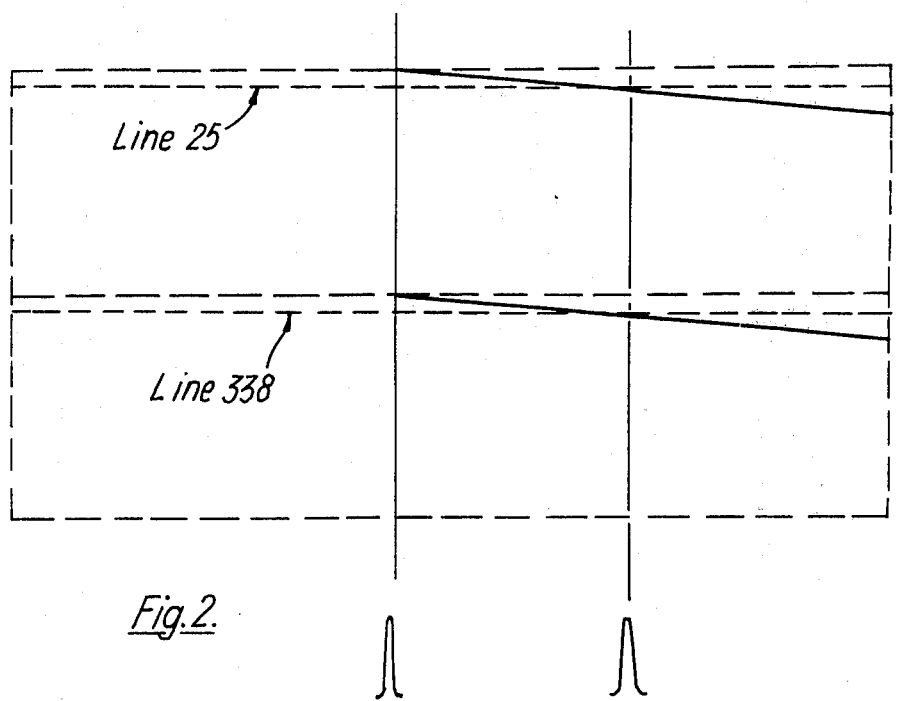
FIG. 2 shows a graticule which can be used with the scanning system of FIG. 1.

A graticule on glass as shown in FIG. 2 can be used as the reference geometric pattern to measure and control the distance between the two scans in the following way. The heavy solid lines (two vertical and two sloping downward to the right) are the graticule and the dashed rectangles represent the limits of the secondary images of the two vertically displaced rasters. The arrangement is such that each time the scanning beam crosses a line of the graticule a pulse is produced by the photocell 9.

Thus, the signal generated by amplification of the signal from the photocell 9 will be as shown in FIG. 2 below the graticule for scanning lines 25 and 338. For convenience the interval between the two pulses for each of these two lines is shown to be equal but this is not a necessary condition.

Referring to FIG. 3 after amplification in a head amplifier 11 pulses from an odd field line (from the upper raster) and even field line (from the lower raster) are selected in separate paths at 12 and 15 and the interval between the two pulses generated by each line is measured in 14 and 15 either by generating a ramp which is started by the first pulse and terminated by the second or some similar analogue means or by a digital process of pulse counting a high frequency oscillator or similar means. The signal stored in the store 16 is thus a measure of the interval between the respective two pulses in the selected line in the upper odd field. Since the interval between the two pulses is determined by the position of the chosen scanning line relative to the downward sloping graticule line, the signal stored in 16 is a measure of the vertical position of the upper raster. Similar considerations apply in respect of the lower raster whose vertical position is given by the signal stored in 17. Furthermore, the difference between the values stored in 16 and 17 will be a measure of the distance between the two rasters, and this difference is measured by a comparator 18. If the distance between the odd and even field rasters should increase, then the interval between the odd field pulses will decrease and the interval between the even field pulses will increase. This will lead to a corresponding change in the difference between the values stored in 16 and 17. This change in the difference is measured by the comparator 18 and integrated to provide a control signal which is coupled to the vertical deflection amplifier 19 which counteracts this shift by appropriately adjusting the current in the vertical deflection coil 20 of the cathode ray tube.

As mentioned earlier, the interval between the two sets of pulses does not have to be equal. A reference signal can be fed to the comparator, or the count can be changed in one of the pulse counters so that the desired distance is maintained between the odd and even fields, controlled by the feedback loop. It is particularly useful in this application if the distance maintained between the odd and even fields is adjustable since as the film shrinks the distance between the two rasters must be changed to maintain correct registration, therefore a film shrinkage signal can be coupled to the system.

I claim:

1. A flying spot film scanning system comprising a cathode ray tube for producing a pair of vertically displaced scanning rasters corresponding to odd and even television fields, an optical system for focussing an image of the rasters in the plane of a film to be scanned, means for diverting a proportion of the light travelling between the cathode ray tube and the film into a secondary light path to form a secondary image of the rasters, means for measuring the vertical position of each secondary raster image, means for comparing the measured vertical positions of the secondary raster images to provide a control signal dependent upon the vertical distance between the secondary raster images, and a feed-back circuit coupled to the vertical deflection circuit of the cathode ray tube to adjust the vertical distance between the rasters in accordance with the control signal.

2. A method according to claim 1, wherein the means for measuring the vertical position of each secondary raster image comprises a reference pattern placed in the secondary image plane, the reference pattern producing for at least one scanning line of each secondary raster image a pair of pulses whose interval is determined by the vertical position of the corresponding secondary raster image relative to the reference pattern, and means for measuring the respective interval between each pair of pulses.

3. A system according to claim 2, wherein the reference pattern is a graticule on glass.

4. A system according to claim 1, wherein light is diverted into the second light path by a semi-reflecting surface disposed in the path of the light travelling between the cathode ray tube and the object plane.

5. A system according to claim 4, wherein the semi-reflecting surface is contained within a glass block.

* * * * *